US012689922B2

(12) United States Patent
Ku et al.

(10) Patent No.: US 12,689,922 B2
(45) Date of Patent: Jul. 21, 2026

(54) METHOD AND APPARATUS FOR AI/ML BASED BEAM MANAGEMENT

(71) Applicant: MEDIATEK INC., Hsinchu (TW)

(72) Inventors: Yu-Jen Ku, San Jose, CA (US); Gyu Bum Kyung, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 317 days.

(21) Appl. No.: 18/529,092

(22) Filed: Dec. 5, 2023

(65) Prior Publication Data

US 2024/0196242 A1 Jun. 13, 2024

Related U.S. Application Data

(60) Provisional application No. 63/386,330, filed on Dec. 7, 2022.

(51) Int. Cl.
*H04W 24/08* (2009.01)
*H04L 41/16* (2022.01)

(52) U.S. Cl.
CPC ............. *H04W 24/08* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 2024/0031824 A1* | 1/2024 | Raghavan | H04W 16/28 |
| 2024/0098533 A1* | 3/2024 | Leng | H04W 24/02 |
| 2024/0251258 A1* | 7/2024 | Monteiro | H04W 36/32 |

* cited by examiner

*Primary Examiner* — Diane L Lo
(74) *Attorney, Agent, or Firm* — Troutman Pepper Locke LLP; Tim Tingkang Xia, Esq.

(57) ABSTRACT

A UE receives, from a base station, a first monitoring configuration for monitoring an artificial intelligence/machine learning (AI/ML) model for managing a set of beams. The UE measures a first subset of the set of beams. The UE performs inference using the AI/ML model based on measurements of the first subset to determine predication values of a second subset of the set of beams. The second subset is selected based on the first monitoring configuration. The UE measures the second subset of the set of beams to determine measured values of the second subset. The UE calculates one or more performance metrics based on the predication values and the measured values of the second subset. The one or more performance metrics are selected based on the first monitoring configuration.

20 Claims, 14 Drawing Sheets

400

402

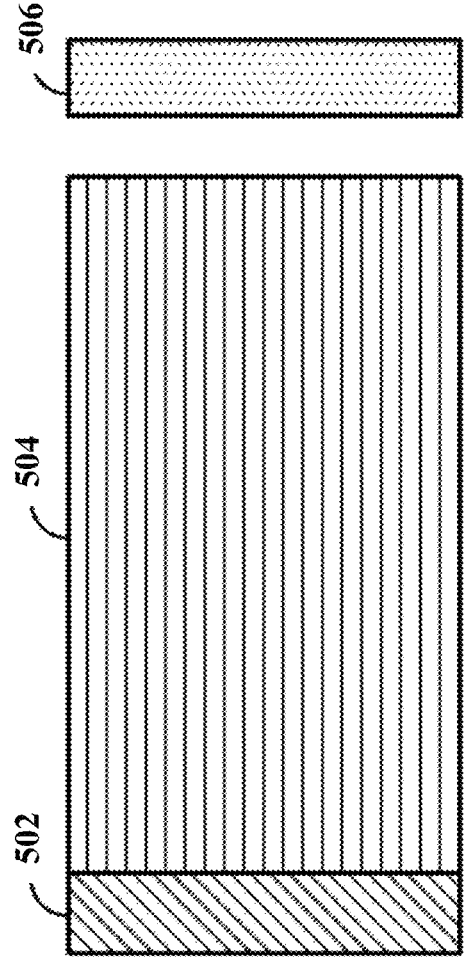
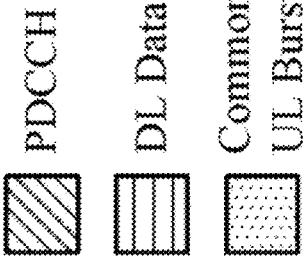
PDCCH
DL Data
Common
UL Burst
FIG. 5

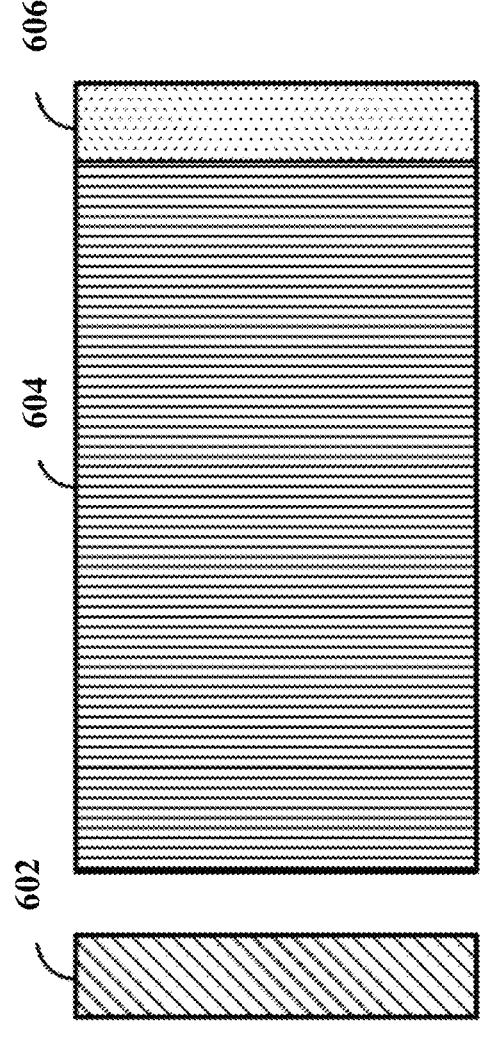
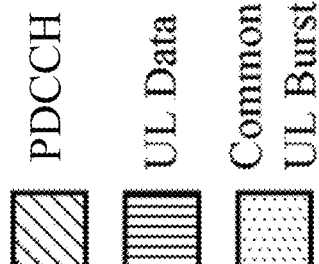
PDCCH
UL Data
Common
UL Burst
FIG. 6

1100

1102

1104

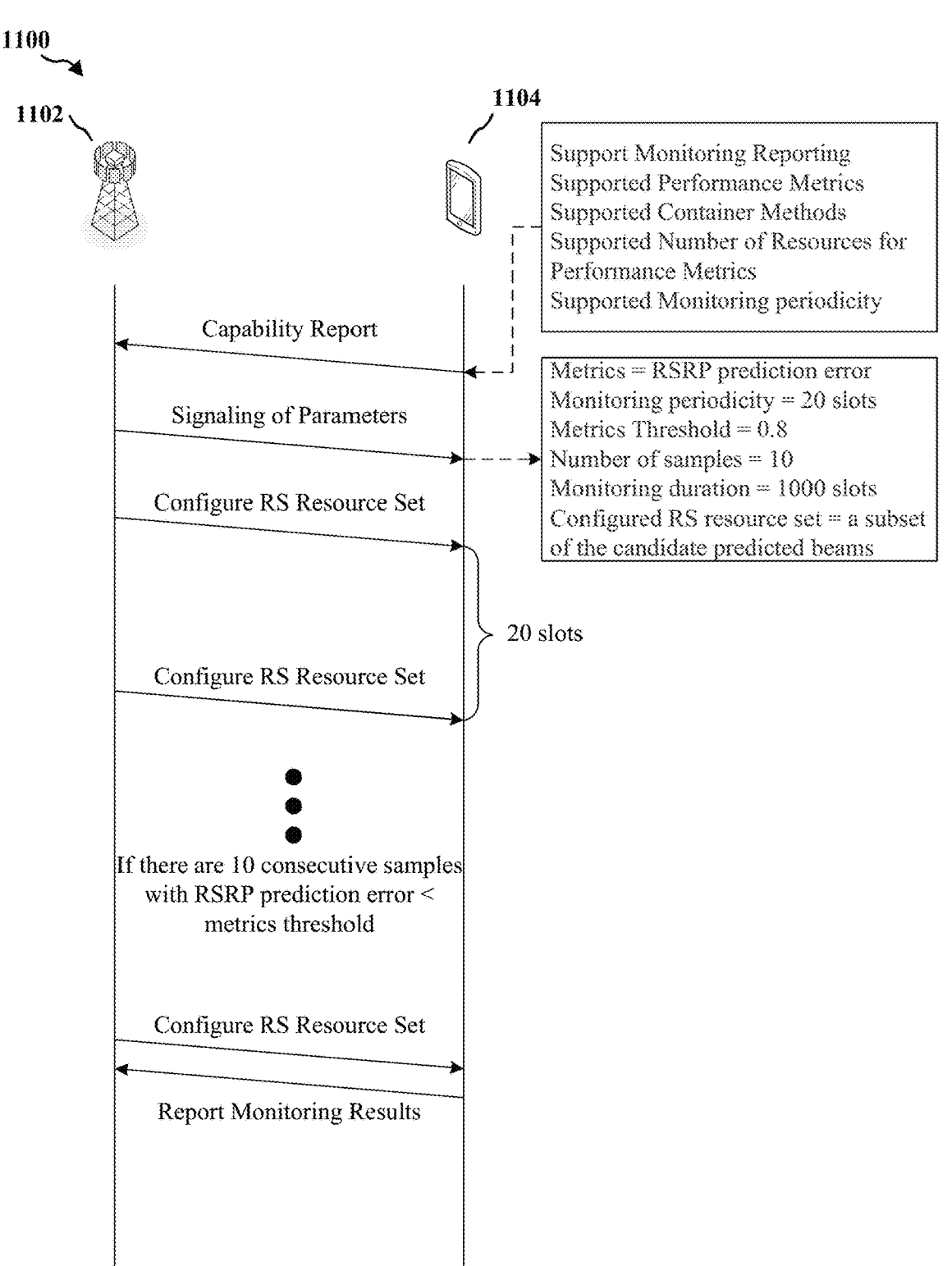

Support Monitoring Reporting
Supported Performance Metrics
Supported Container Methods
Supported Number of Resources for
Performance Metrics
Supported Monitoring periodicity Capability Report Metrics = RSRP prediction error
Monitoring periodicity = 20 slots
Metrics Threshold = 0.8
Number of samples = 10
Monitoring duration = 1000 slots
Configured RS resource set = a subset
of the candidate predicted beams Signaling of Parameters Configure RS Resource Set 20 slots Configure RS Resource Set If there are 10 consecutive samples
with RSRP prediction error <
metrics threshold Configure RS Resource Set Report Monitoring Results

FIG. 11

METHOD AND APPARATUS FOR AI/ML BASED BEAM MANAGEMENT

CROSS-REFERENCE TO RELATED APPLICATION(S)

This application claims the benefits of U.S. Provisional Application Ser. No. 63/386,330, entitled "METHOD AND APPARATUS FOR AI/ML-BASED BEAM MANAGE-MENT" and filed on Dec. 7, 2022, which is expressly incorporated by reference herein in its entirety.

BACKGROUND

Field

The present disclosure relates generally to communication systems, and more particularly, to AI/ML based beam management.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives, from a base station, a first monitoring configuration for monitoring an artificial intelligence/machine learning (AI/ML) model for managing a set of beams. The UE measures a first subset of the set of beams. The UE performs inference using the AI/ML model based on measurements of the first subset to determine predication values of a second subset of the set of beams. The second subset is selected based on the first monitoring configuration. The UE measures the second subset of the set of beams to determine measured values of the second subset. The UE calculates one or more performance metrics based on the predication values and the measured values of the second subset. The one or more performance metrics are selected based on the first monitoring configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram showing an example of a DL-centric slot.

FIG. 6 is a diagram showing an example of an UL-centric slot.

FIG. 11 is a diagram illustrating an embodiment of a UE reporting a monitoring event.

DETAILED DESCRIPTION

Figure 1:
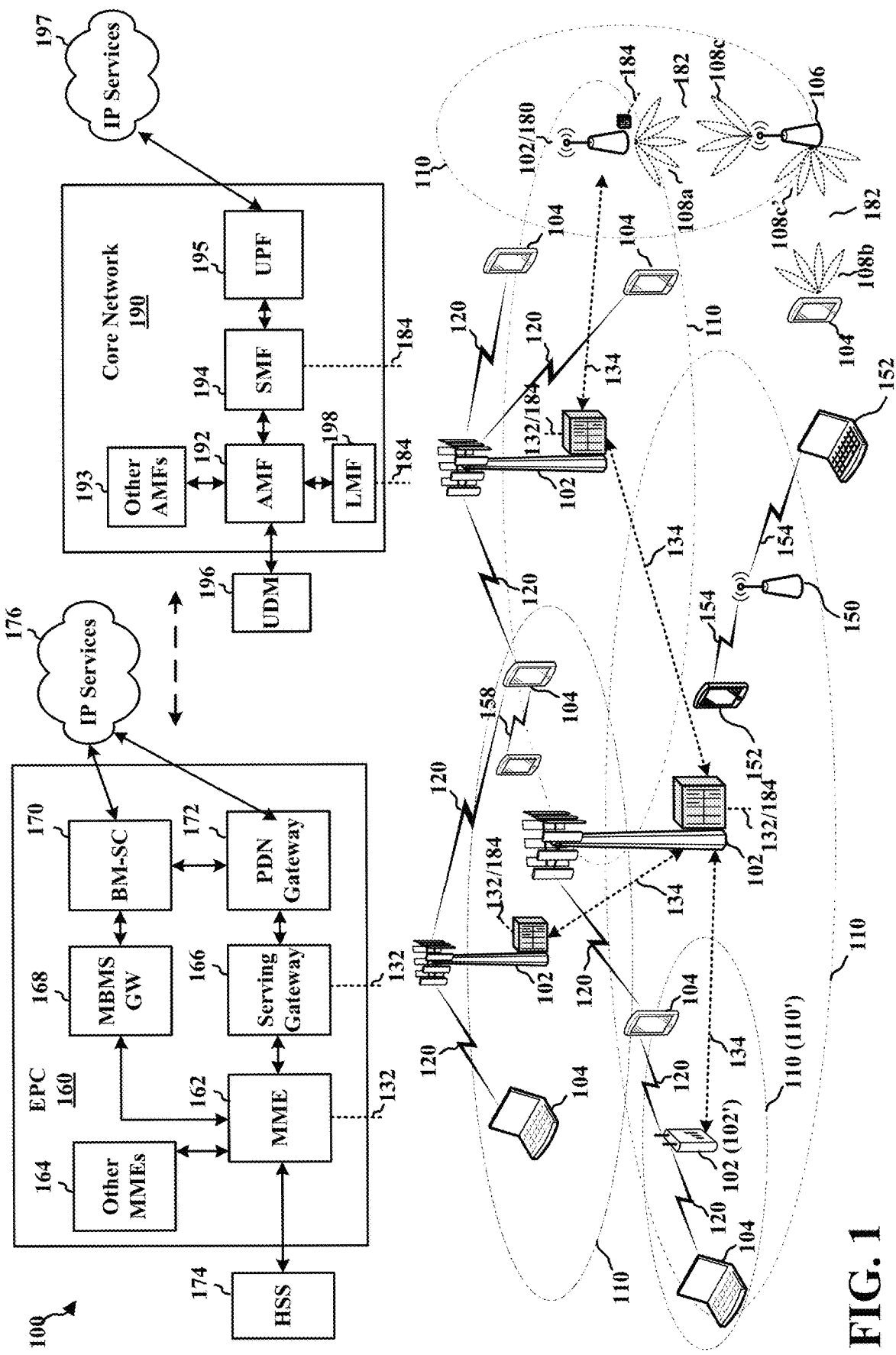
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5GNR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
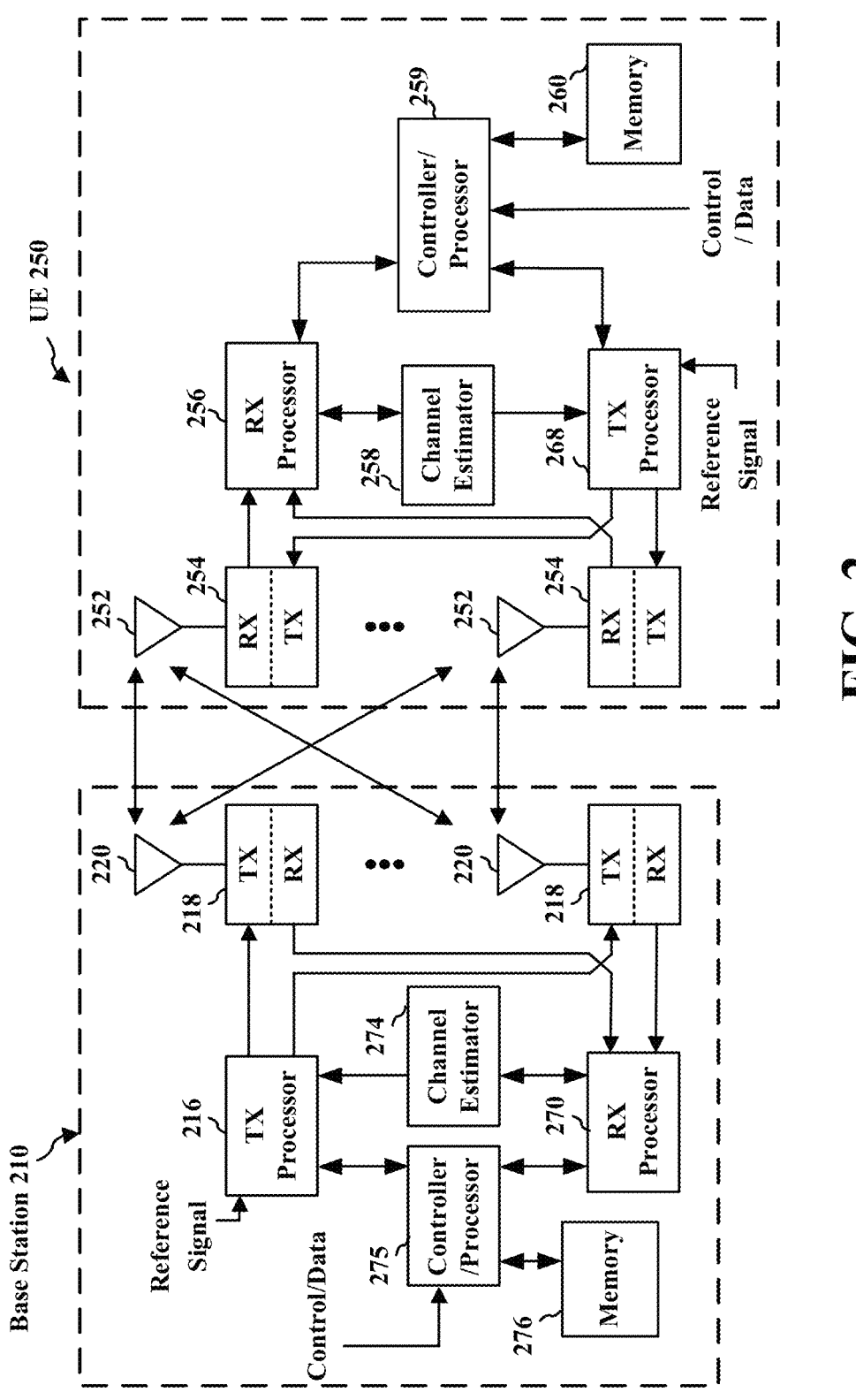
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
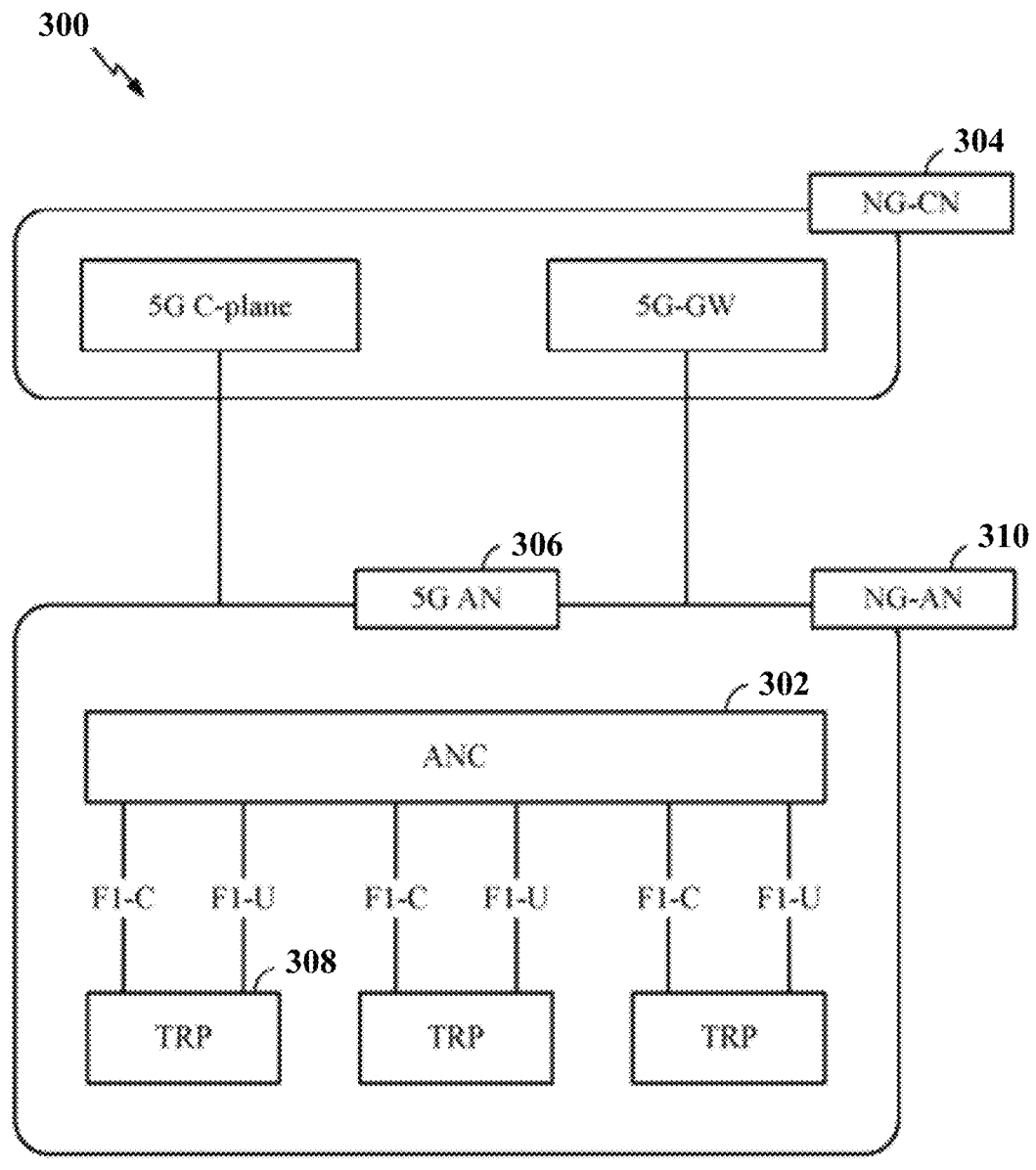
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
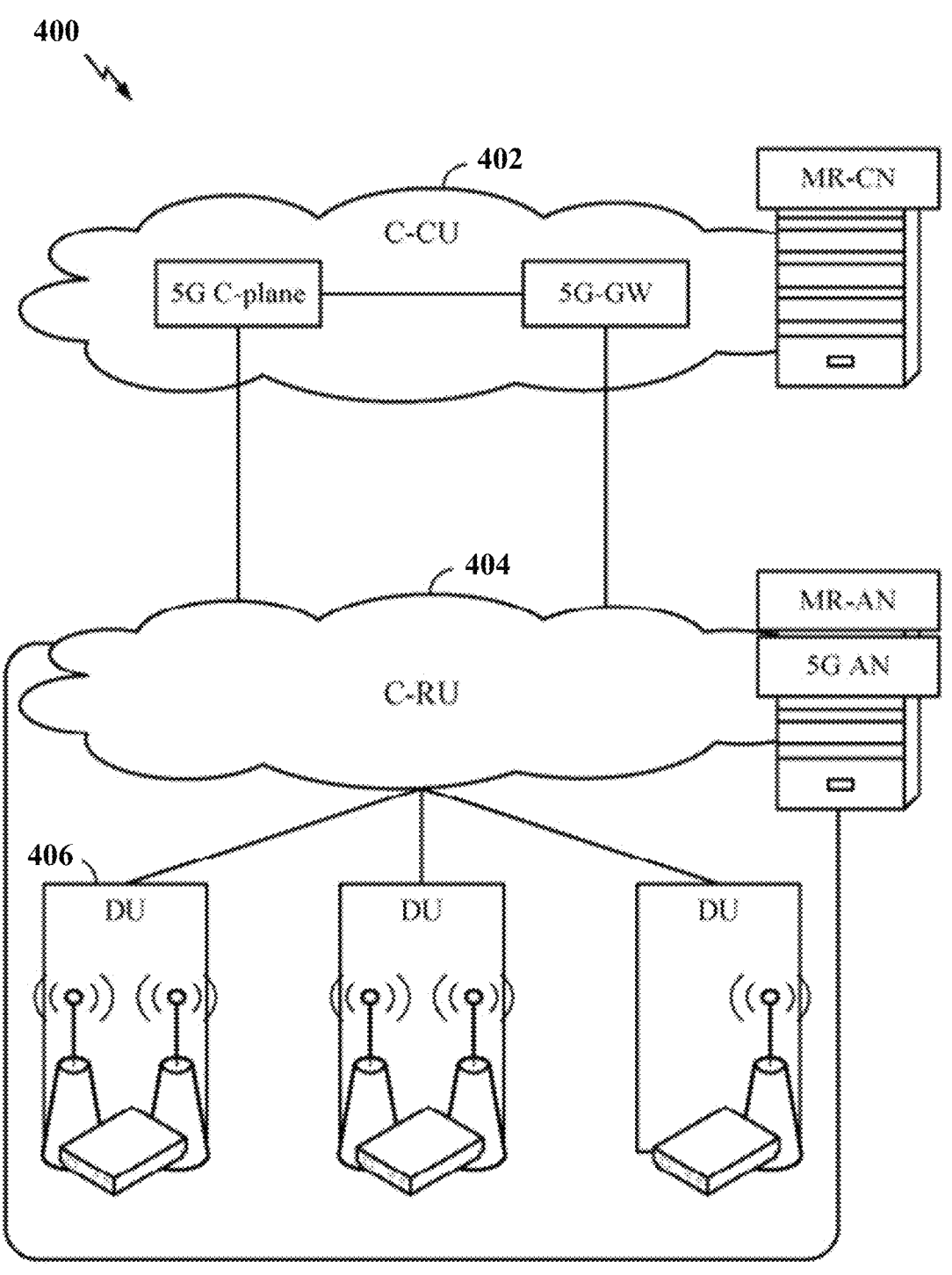
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
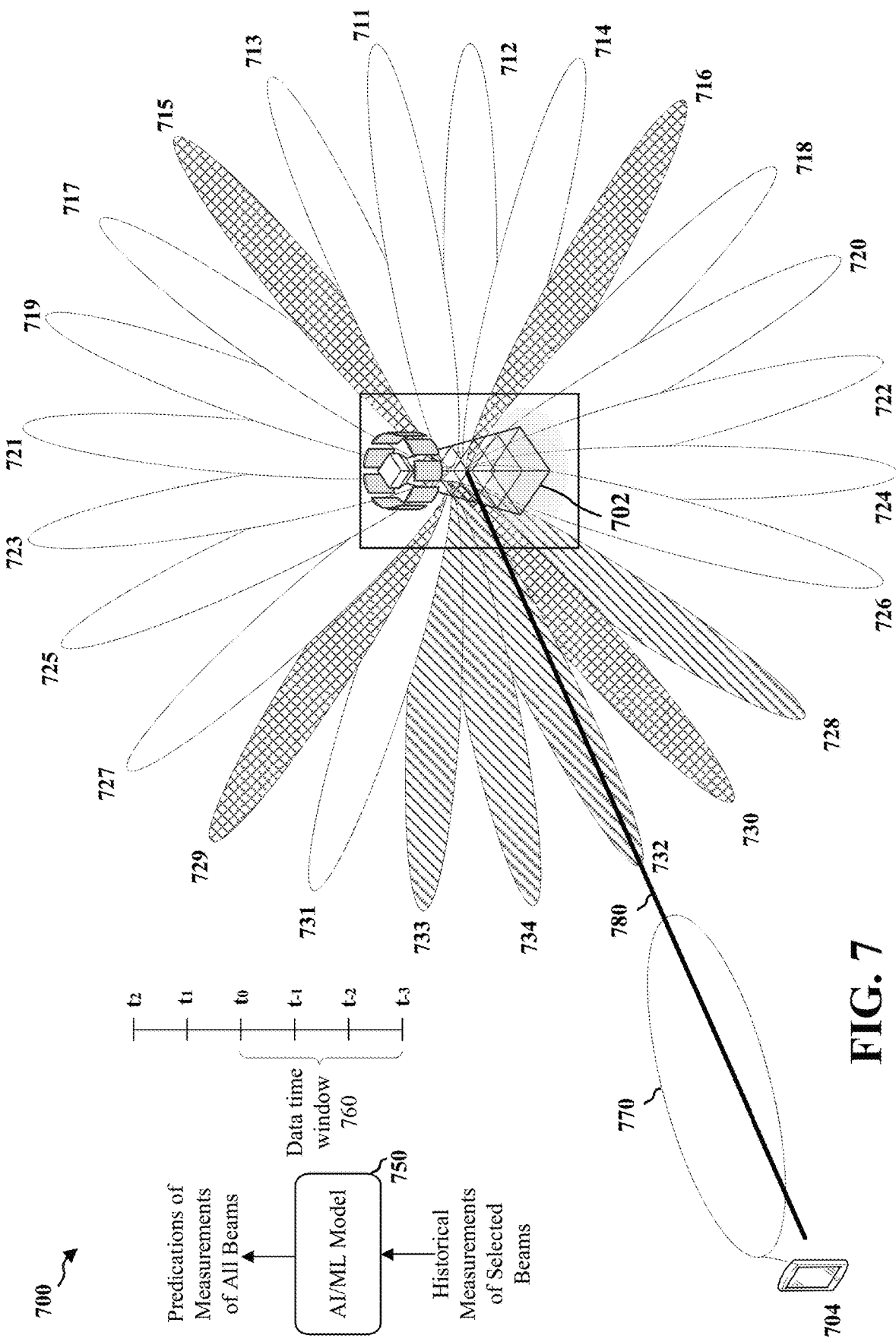
FIG. 7 is a diagram illustrating AI/ML model for spatial and temporal domain beam prediction.

FIG. 7 is a diagram 700 illustrating an AI/ML model for spatial and temporal domain beam prediction. In this example, the base station 702 transmits beams 711-734 simultaneously in various directions through a channel 780. After identifying the incoming beams, the UE 704 can calculate the L1-Received Signal Received Power (L1-RSRP) for each beam. The L1-RSRP is the physical layer's average received signal power per resource element, measured on resource elements that are carrying either secondary synchronization signals or channel state information—reference signals (CSI-RSs).

A machine learning algorithm is used to analyze history of signal strengths from a subset of beams and tries to find patterns or trends in the data. This helps predict signal strengths for the remaining unmeasured beams. By recognizing patterns in the historical data from the subset of beams, the algorithm can predict signal strengths for the other beams even when the UE is moving.

In this example, the base station 702 is equipped with multiple antennas and has the capability to transmit the 24 different beams 711-734 simultaneously in various directions. The UE 704 that is moving from time to time, is equipped with its own antennas, and periodically measures channel metrics such as RSRP from a strategically chosen subset of 4 out of the 24 beams (e.g., beams 715, 716, 729 and 730) transmitted by the base station 702. The set of beams (e.g., beams 715, 716, 729 and 730) that is being measured as AI/ML input (sensing beams) is referred as Set B of beams. The set of beams (e.g., the 24 beams) that is being predicted as AI/ML output (usually communication beams) is referred as Set A of beams.

The measurements collected from these 4 beams are saved over time as historical data. The historical data captures the channel metrics over time for the subset of beams, painting a dynamic portrait of the UE 704's interaction with those beams. The UE 704 may be configured with a historical data time window 760 the measurements during which are stored at the UE 704. In the example, the current time is $t_0$. The historical data time window 760 is from time $t_{-3}$ $t_0$ time to. The measurements data of the subset of beams 715, 716, 729 and 730 and obtained during the historical data time window 760 are stored at the UE 704 and are used as input to the AI/ML model 750 to predict measurements of beams that are not measured at the current time to and measurements of all beams at future time $t_1$, $t_2$.

The historical data serves as input to the machine learning algorithm to predict channel metrics for the unmeasured beams, guiding the UE 704 on which beam to focus on when it needs to communicate with the base station 702. The algorithm can therefore predict channel metrics for all beams based on analyzing patterns and trends in the historical data from the subset of beams.

Another subset of beams (e.g., beams 711, 721, 724 and 734), which typically are not measured in routine circumstances, may be periodically sampled and recorded with their channel metrics. This serves to validate the algorithm's predictions against real-world performance, while also updating the AI/ML model. The periodic measurements contribute to algorithm refinement by updating its weights and parameters. As the machine learning algorithm matures, its predictions for optimal beams become increasingly accurate. When the UE 704 initiates communication, it can select a UE transmission or reception beam 770 likely to yield superior signal quality (e.g., an optimal beam) based on the predictions.

Rather than identifying the single best beam, the approach involves predicting the top k beams likely to have the highest channel metrics. Focusing on the top k beams provides superior accuracy in many scenarios. The prediction of the top k beams is achieved by estimating them based on the top k channel metric values. This aligns well with real-world communication needs, enhancing system performance.

The primary output of a classification-based AI/ML model includes the identifiers (ID) of what are predicted to be the top k best beams for communication, complemented by a corresponding prediction confidence score or a predicted RSRP for each beam. These beams are determined to be the most optimal for use in communication based on their anticipated signal strength and reliability. To illustrate, if k is set to a value of 5, the model might predict that the best five communication beams out of the whole set are beams numbered 732, 730, 734, 728, and 733. This predicted ranking enables the UE 704 to make informed decisions regarding which beams that base station 702 and UE 704 to utilize for communication with each other at any given time, thereby optimizing performance based on signal strength and the likelihood of successful data transfer.

Moreover, the output of a regression-based AI/ML model comprises the predicted RSRP values for each communication beam in Set A. This predictive output provides a direct estimation of the expected signal strength for every individual beam in the communication set, allowing for a more fine-grained selection of beams by the UE 704 based on predicted RSRP values.

Figure 8:
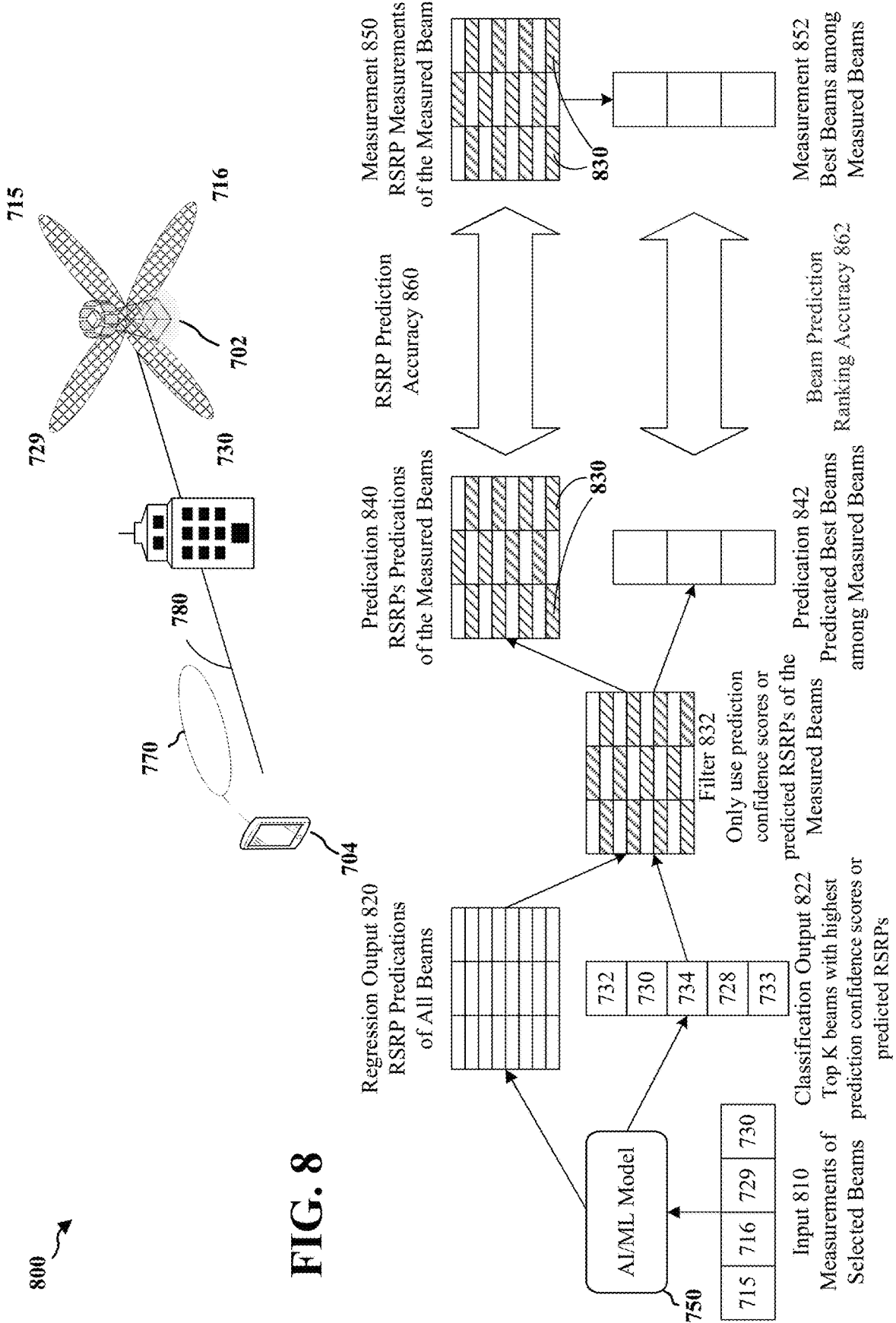
FIG. 8 is a diagram illustrating one round of AI/ML model monitoring.

FIG. 8 is a diagram 800 illustrating AI/ML model monitoring. After the AI/ML model 750 is trained and deployed at the base station 702 and/or the UE 704 for inference, a mechanism is needed to identify if the predictions of the AI/ML model 750 are no longer precise, and to monitor and ensure the prediction accuracy of the AI/ML model 750. In an embodiment, the AI/ML model may be deployed at the UE 704. For example, when the channel 780 changes to a new condition between the base station 702 and the UE 704 that was not included in the training dataset. Or when one or more of the sensing beams (e.g., beams 715, 716, 729 and 730) are blocked by obstacles resulting in very low RSRP measurements.

An input 810 of the model 750 is the measurement of the selected beams (e.g. beams 715, 716, 729 and 730). For a regression model, an output 820 is the predicted RSRPs of all the communication beams. The base station 702 may configure a subset 830 of the communication beams for the UE 704 to measure. The subset 830 indicates which beams need to be measured and compared. A prediction 840 can be derived by using a filter 832 to filter the output 820 to only include the predicted RSRPs of the measured subset 830 beams. RSRP prediction accuracy 860 is calculated by comparing the prediction 840 to the actual RSRP measurements 850 of the beams in the subset 830.

Statistical metrics, such as mean squared error (MSE) or variance, can be used to evaluate a prediction accuracy 860 of the prediction 840 and the RSRP measurements 850. For example, MSE assesses the overall prediction accuracy, while variance measures the model's ability to generalize. Lower MSE values indicate better accuracy, while lower variance values suggest better generalization. MSE evaluates how closely the model's predictions match the actual data, while variance examines the stability and consistency of the model's performance on different datasets.

For a classification model, an output 822 of the AI/ML model 750 is the top K beams with highest prediction confidence scores or predicted RSRPs of all the communication beams. The base station 702 may configure the subset 830 of the communication beams to the UE 704 for measurement. The subset 830 indicates which beams need to be measured and compared. A prediction 842 can be derived by filtering the output 822 to only include the top beams among the measured subset 830, ranked by their prediction confidence scores or predicted RSRP values.

Beam prediction ranking accuracy 862 is calculated by comparing the prediction 842 to the measurement 852 which ranks the measured beams in the subset 830 by their actual measured RSRP values. The accuracy can be represented as TRUE/FALSE (two rank sequences match) or rank correlation metrics such as spearman correlation, Kendall correlation.

In a full scale method, the AI/ML model provides the RSRP values for all the beams in Set A. The model's accuracy, or performance, is assessed by comparing the predicted RSRP values to the actual RSRP values, known as the ground truth. This comparison involves measuring the difference between the two sets of RSRP values of Set A to determine the model's performance. The model's accuracy, or performance, can also be assessed by comparing the top K beams with the highest prediction confidence scores or predicted RSRPs and the top K beams with the highest actual RSRP values.

The full scale method can lead to significant beam management overhead, essentially requiring the same amount of work as traditional non-AI methods of beam management. If the full set of beams (Set A) is used for model monitoring, this results in a substantial reporting overhead because the UE must report all of these RSRP measurements to the network's base station.

To mitigate this downside, in a low overhead method, the UE is configured to measure only a subset (e.g., half) of Set A beams, rather than the entire set. By using the measurement results from this subset, they can evaluate the model's performance, which, while not as accurate as measuring all beams (because only a part is measured and some monitoring errors or misses can occur), significantly reduces measurement and reporting overhead requirements.

In the full scale method, the UE measures all of Set A beams and takes Set B as input to the model. The model's output is then compared with the measurements from Set A to assess its performance. In the low overhead method, the UE measures only a portion (e.g., half) of Set A beams to perform the performance comparison. This would reduce measurement demands and reporting overheads compared to the full scale method, although some loss of accuracy in model prediction evaluation is accepted as the trade-off.

Figure 9:
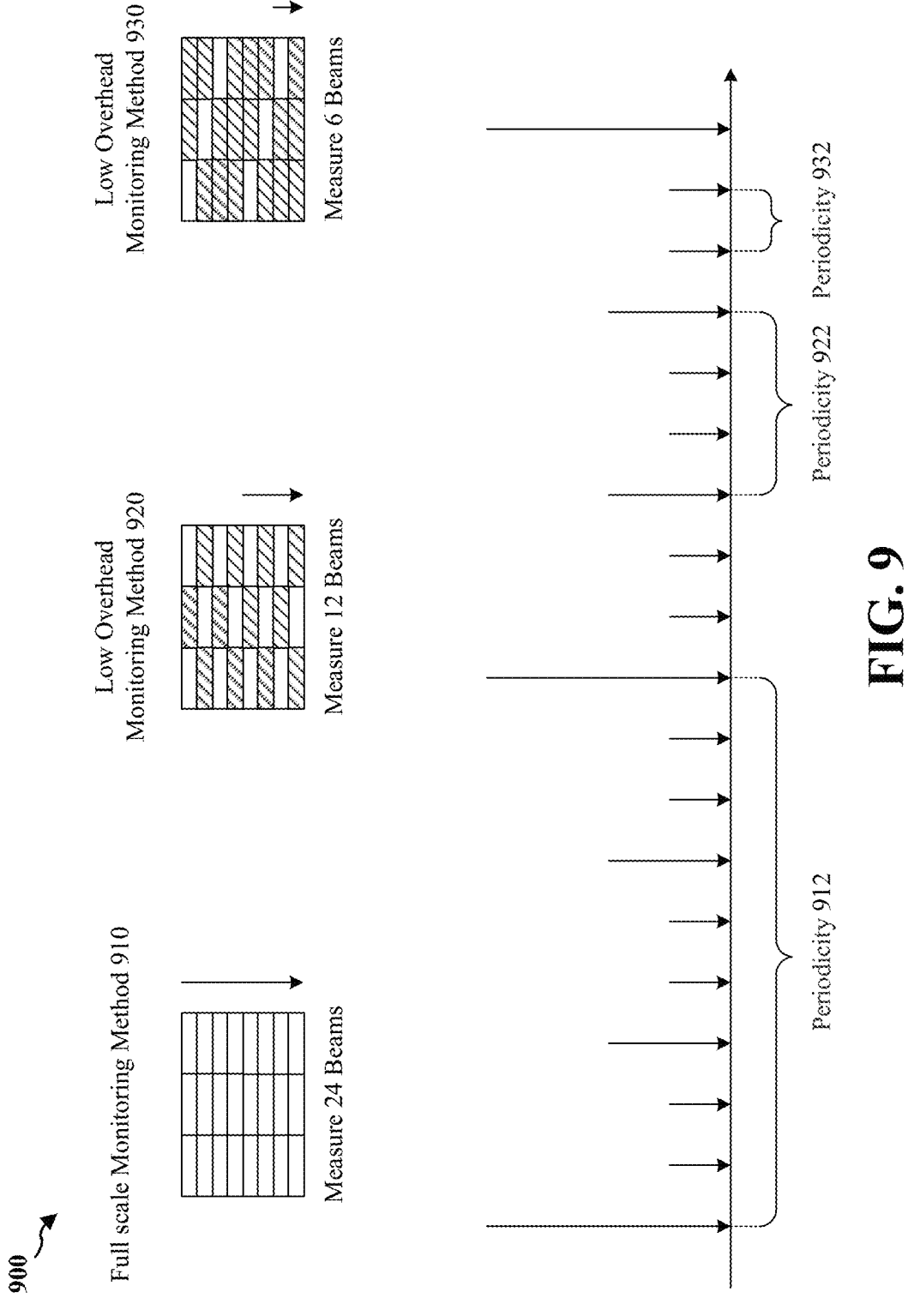
FIG. 9 is a diagram illustration an example for jointly use of different model monitoring methods with difference monitoring periodicities.

FIG. 9 is a diagram 900 illustrating an example of the joint use of different AI/ML model monitoring methods with customizable monitoring periodicities. This example features the concurrent application of three distinct model monitoring methods. The first is a full scale monitoring method 910, with a configurable periodicity 912, which entails the measurement of all 24 communication beams. The second is a lower overhead monitoring method 920, with a configurable periodicity 922, that involves measuring half of the communication beams, for instance, 12 beams. The third is another low overhead monitoring method 930 that takes into account a smaller subset of 6 beams, with a configurable periodicity 932.

The periodicities 912, 922, and 932 are adjustable based on network management requirements. The choice of monitoring frequency is influenced by the outcome of performance comparisons or the level of prediction accuracy that is necessary for the network's operation. For instance, should the monitoring method 930, which has the least overhead, detect a decrease in the AI/ML model's performance, it could trigger a reduction in the periodicity 922 for the lower overhead monitoring method 920 and the periodicity 912 for the full scale monitoring method 910 to enhance the performance of the AI/ML model's output. This adaptive approach ensures that the beam management process remains efficient, balancing the trade-off between accuracy and resource usage.

Furthermore, if a scenario demands high prediction accuracy from the AI/ML model, the network might adjust the periodicity 912 of the full scale monitoring method 910 to become more frequent, thereby obtaining more granular data to refine the model predictions.

The diagram 900 presents a visual representation of how these monitoring methods, each with different measurement scopes and update rates, can be deployed. This flexibility in monitoring strategies enables the network to maintain a high level of service quality by promptly identifying and rectifying any potential decline in model prediction performance.

Figure 10:
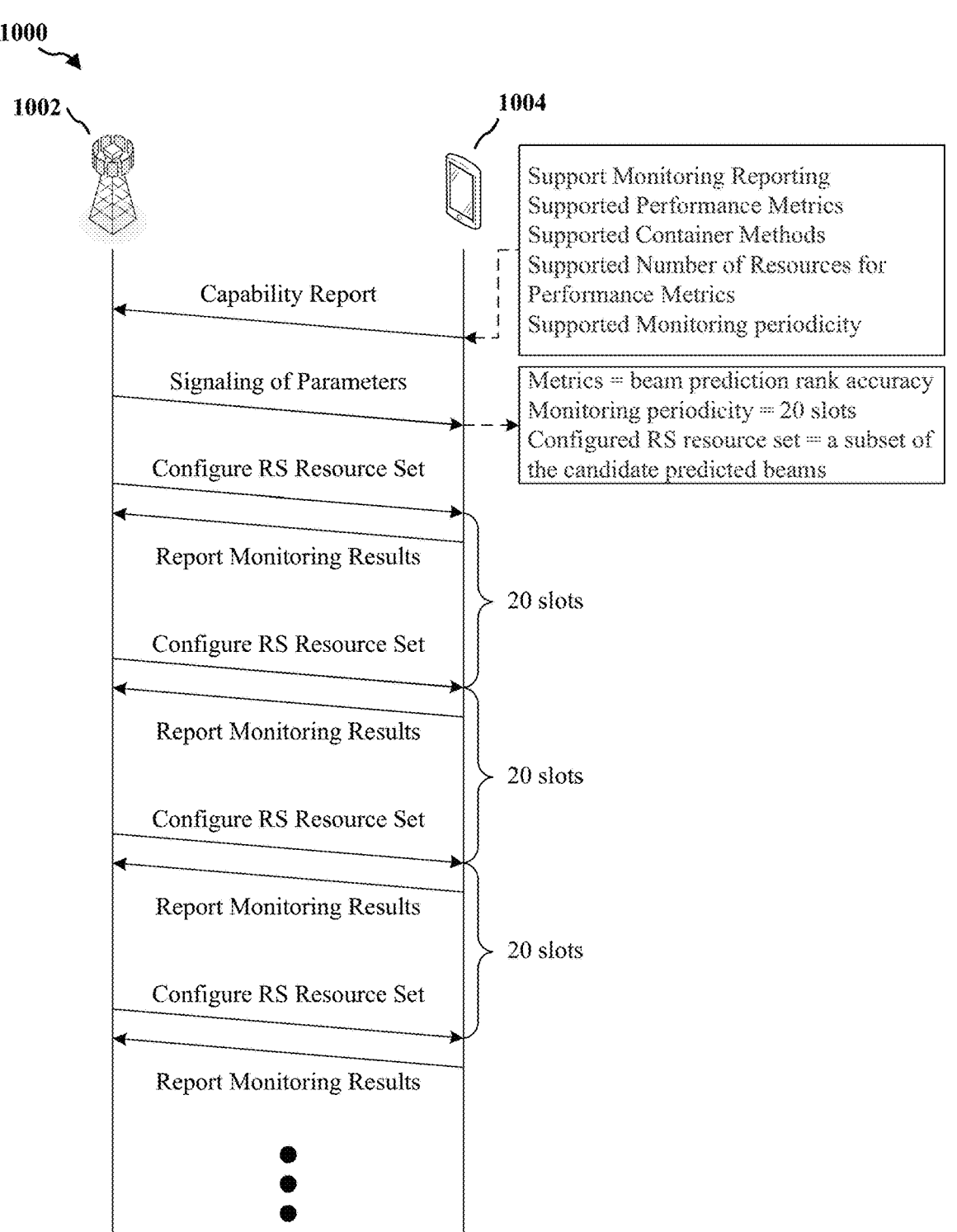
FIG. 10 is a diagram illustrating an embodiment of a UE reporting calculated metrics.

FIG. 10 is a diagram 1000 illustrating an embodiment of a UE reporting capabilities and reporting the calculated metrics. A UE 1004 communicates with a base station 1002, wherein the UE 1004 is capable of transmitting a capability report that outlines its abilities with regard to monitoring and reporting AI/ML-based beam management functionality.

The capability report includes several components that portray the capabilities of the UE 1004:

1. Support for Monitoring Reporting: This boolean parameter indicates whether the UE 1004 can perform reporting functions for AI/ML-based beam management model or functionality monitoring. If the UE 1004 is capable, the value is True; if not, the value is False.

2. Supported Performance Metrics: This component specifies the types of performance metrics that the UE 1004 can support. The metrics include:

Beam Prediction Accuracy: It refers to the UE's ability to derive and report how accurately it can predict the best beam or beams for communication. This metric involves the probability of a UE to accurately predict the best beam or beams for communication.

Beam Prediction Ranking Accuracy: This metric involves ranking a set of beams based on their measured RSRP and predicted confidence from the model output. The UE assesses whether two ranked sequences match, with accuracy potentially represented as a True/False binary outcome or using rank correlation methods such as Spearman or Kendall correlation.

RSRP/RSRQ/SINR Prediction Accuracy: These metrics might be represented by statistical scores such as Mean Squared Error (MSE), Normalized MSE (NMSE), Root MSE (RMSE), variance, etc., that indicate the precision of the UE's predictions.

Confidence Scores for Set A Beams: Based on model output, the UE may also quantify the confidence level for each predicted beam's likelihood of being the best beam for communication.

Measurement: This simply denotes the UE's ability to report the measured signal strength of each beam.

The value for supported performance metrics is a sequence including identifiers for the supported metrics, each corresponding to a particular method of accuracy measurement or prediction modeling. For example, the value may be SEQUENCE of {"beam prediction accuracy::Top-1", "beam prediction accuracy::Top-2", . . . , "beam prediction accuracy::L1-RSRP difference", . . . , "beam prediction ranking accuracy::binary", "beam prediction ranking accuracy::spearman_corr", . . . , "RSRP prediction accuracy::NMSE", . . . "confidence_scores", . . . , "RSRP Measurement", "RSRQ Measurement" }. The SEQUENCE structure in which these metrics are presented shows that the UE can report a list of its supported performance metrics, informing the base station of the full range of monitoring capabilities available, and enabling precise and flexible beam management strategies.

3. Supported Container Methods: It represents the UE's supported reporting formats (container methods) for conveying the monitored performance metrics. This includes various formats for reporting the different types of metrics outlined above, such as beam prediction accuracy, prediction accuracy of RSRP/RSRQ/SINR, signal strength measurements, etc. The value for supported container methods is a sequence including identifiers for various reporting formats or methods that the UE supports for transmitting monitored performance metrics back to the network base station. For example, the value may be SEQUENCE of {Container_method1, Container_method2, Container_method3, Container_method4, . . . }.

4. Supported Number of Resources for Performance Metrics: This parameter indicates the maximum number of resources that the UE can utilize to calculate the performance metrics from the measurements it has taken. The value may be SEQUENCE of ENUMERATED {n1,n2,n3,n4, . . . , nK}, representing the UE's capability to calculate metrics using n1,n2,n3,n4, . . . , nK resources or samples.

5. Supported Monitoring Frequency: This component signifies the range of monitoring frequencies that the UE can handle for collecting data and reporting on the performance of the beam management system. It indicates how often the UE can carry out measurements and monitoring tasks as per network requirements. The value may be SEQUENCE of ENUMERATED {n1, n2,n3,n4, . . . , nK}, referring to a list of predefined frequency levels that the UE can support for monitoring purposes.

Each of these capabilities, as reported by the UE 1004, enables better network management by the base station 1002, allowing it to configure beam management operations that best suit the UE's abilities, thus optimizing communication efficiency and maintaining a high-quality service.

For UE side model, even though the monitoring method is up to UE's implementation, there can be a mechanism which allows the network (NW) to configure cell-specific monitoring conditions for the UE to monitor its AI/ML model/functionality. This means that while the UE can choose its own method for monitoring its AI/ML model, the network can still configure some standardized parameters to align the monitoring conditions with the UE.

Specifically, this standardization mechanism should allow the network to align the following parameters with the UE, so that the UE can use the corresponding configurations of the methods to monitor its AI/ML model:

Metrics used for monitoring: This refers to the performance metrics used to evaluate the AI/ML model. Some options are "beam prediction accuracy", "beam prediction ranking accuracy", or "RSRP prediction error". For example, the Beam Prediction Ranking Accuracy 862 as shown in FIG. 8 may use ranking accuracy metrics like True/False matches or correlation methods to compare ranked sequences. For another example, the RSRP prediction accuracy 860 as shown in FIG. 8 may use error metrics such as MSE or RMSE to compare predicted and measured RSRP values.

Number of resources for calculating metrics: This refers to the number of measured reference signal (RS) resources or beams that will be used to calculate the performance metrics. For example, this could be the same number of RS resources measured, or the Top K beams based on measurements and model outputs, like the number of beams in the ranked sequences compared in FIG. 8.

Monitoring frequency/periodicity: This specifies how often the monitoring method will be used or applied by the UE to collect performance data, like every X time slots.

In this way, the network can standardize and configure the key parameters for UE-side model monitoring to align with the UE's own monitoring implementation.

Further, the network can configure additional parameters for the UE to determine if the AI/ML model is performing well or poorly:

Threshold of the metrics for performance comparison: The network can specify a threshold value for the performance metrics being monitored, such as beam prediction accuracy. This threshold is used to determine if the AI/ML model's prediction is good or bad for a single monitoring instance. For example, if the threshold is set at 90% for prediction accuracy, then an accuracy of 95% for one monitoring instance would be considered good, while 85% accuracy would be considered poor.

Statistic threshold of the metrics: In addition to a per-instance threshold, the network can configure a statistical threshold applied over multiple monitoring samples. For example, this could be the percentage of monitoring instances over time where the metric must exceed the threshold. If the statistical threshold is 60% and the per-instance threshold is 90%, then at least 60% of the monitoring samples would need to have a per-instance accuracy greater than 90% to consider the overall performance good.

Number of samples: This parameter indicates the minimum number of monitoring samples that must be collected overtime before applying the statistical threshold. For example, the network could configure that at least 100 instances are required to determine if 60% of them exceed the per-instance 90% accuracy level.

These additional parameters allow the network to specify thresholds both for individual monitoring instances as well as aggregate performance over time when determining if the AI/ML model meets the desired performance criteria. The number of samples indicates the minimum set size for the statistical observation.

More specially, in this example, based on the capability report from the UE 1004, the base station 1002 determines that the UE 1004 supports monitoring AI/ML-based beam management models and configures a CSI-ReportConfig configuration for the UE 1004. A "enableAIreporting" parameter is set to "ON". This instructs the UE to monitor the AI/ML model and report its findings according to the specified parameters.

Further, a "Monitoring_reporting" parameter indicates that the report configuration is specifically for monitoring and reporting the performance of the AI/ML model functionality. When the network configures the CSI reporting for the UE to monitor the AI/ML model, this "Monitoring_reporting" parameter essentially acts as a flag to enable the monitoring functions. It tells the UE that the performance metrics, container methods, resources, frequencies etc. that follow are specifically for the purpose of monitoring and reporting on the AI/ML model, as opposed to normal CSI reporting.

A parameter "Performance_metrics" is used to indicate which performance metric the UE 1004 should use to determine the model's performance and report to the base station 1002. The parameter can include a choice of beam prediction accuracy, beam prediction ranking accuracy, RSRP/RSRQ/SINR prediction accuracy, confidence scores for beam(s) in Set A based on model output, and measurement, as described supra. This may be selected from the "supported performance metrics" in the UE's capability report. For example, Performance_metrics could be set to "beam prediction rank accuracy".

A "Container_methods" parameter indicates the CSI report format (container method) that the UE 1004 should use to report the monitored performance metrics and/or a determination of whether the model is performing well or poorly. It can be a choice of predefined container method formats. For example, container method formats "container method 1", "container method 2", etc. may be defined, and the network configures the UE to use one of those specific container method formats to report the monitoring data. This allows different report formats to be used for different types of metrics or determinations. The parameter could indicate that the UE reports either the metrics or just the determination of whether the model performs well or poorly. This may be also selected from the "supported container methods" in the UE's capability report.

A "Number_of_resources" parameter indicates the number of beams among the measured beams that will be used for calculating the performance metrics. This allows the base station 1002 to control the beam measurement overhead. The value may come from the "supported number of resources for performance metrics" in the UE's capability report.

A "Monitoring_freq" parameter indicates how often the UE 1004 will measure the configured reference signal resources for monitoring purposes. This monitoring frequency may come from the "supported monitoring frequency" in the UE's capability report. For example, if Monitoring_freq is set by the network configuration to 20 slots, that means the UE is required to measure the configured reference signals every 20 slots in order to check the beam predictions or model outputs.

The UE 1004 then follows the configuration to perform monitoring by measuring the configured resource set, running model inference, calculating the specified performance metric (e.g. beam prediction rank accuracy), and reporting the results based on the configured container method. This completes one round of model monitoring. The UE 1004 repeats this process at intervals specified by the monitoring frequency parameter.

The entire process is iterative and aligns with the UE's capability to perform AI/ML model monitoring and reporting, ultimately enabling the base station 1002 to manage and optimize beam management operations effectively.

FIG. 11 is a diagram 1100 illustrating an embodiment of a UE reporting a monitoring event. Similar to the example of FIG. 10, the base station 1102 configures "enableAIreporting", "Monitoring_reporting", "Performance_metrics", "Container_method", "Number_of_resources", "Monitoring_freq" parameters for the UE 1104.

Further, in this example, the base station 1102 can configure the UE 1104 to report a monitoring event that determines if the AI/ML model is performing well or poorly. This event is defined based on observing consecutive "occurrence instances" at a certain monitoring frequency. An occurrence instance means that in a single monitoring sample, the monitored performance metric (e.g. MSE or RSRP prediction) meets a desired threshold.

To configure this event reporting, the base station 1102 may signal additional parameters to the UE 1104. A "Metrics_threshold" parameter indicates the threshold value to use for comparison. For example, if the metrics threshold is 0.8 for the MSE, then an occurrence instance is when the monitored MSE is less than 0.8 in one monitoring instance. An occurrence instance flags a performance issue in a single monitoring sample. A "Number_of_samples" parameter indicates the required consecutive number of instances for an event occurrence. For example, Number_of_samples=10 means 10 consecutive instances of Performance_metrics <Metrics_threshold constitutes an event.

"Monitoring_duration" indicates when the UE 1104 can stop monitoring for the event if no event is detected after a period of time slots or ms. If Number of samples is 10, then 10 consecutive monitoring instances where the MSE is less than 0.8 constitute an event to report poor model performance. The monitoring frequency parameter described supra indicates how often the UE collects the monitoring metrics to check for the string of occurrence instances. Consecutive degraded performance samples at a regular frequency suggest an ongoing performance problem, resulting in the reported event that the model is not functioning properly. "Monitoring_duration" indicates when the UE 1104 can stop monitoring for the event if no event is detected after a period of time. Normally, once the UE detects the event by observing the required consecutive occurrence instances according to the other parameters such as Number_of_samples, the event is reported and monitoring ends. However, in case the event criteria is not met within the expected timeframe, the "Monitoring_duration" parameter sets an upper limit to how long, in slots or milliseconds, UE keeps monitoring before giving up and ending the process, without detecting the event.

The UE 1104 then follows this configuration, performs monitoring at the specified intervals, calculates the configured performance metric, determines if an event occurrence is detected based on the threshold comparisons, and reports the event detection status to the base station 1102.

Figure 12:
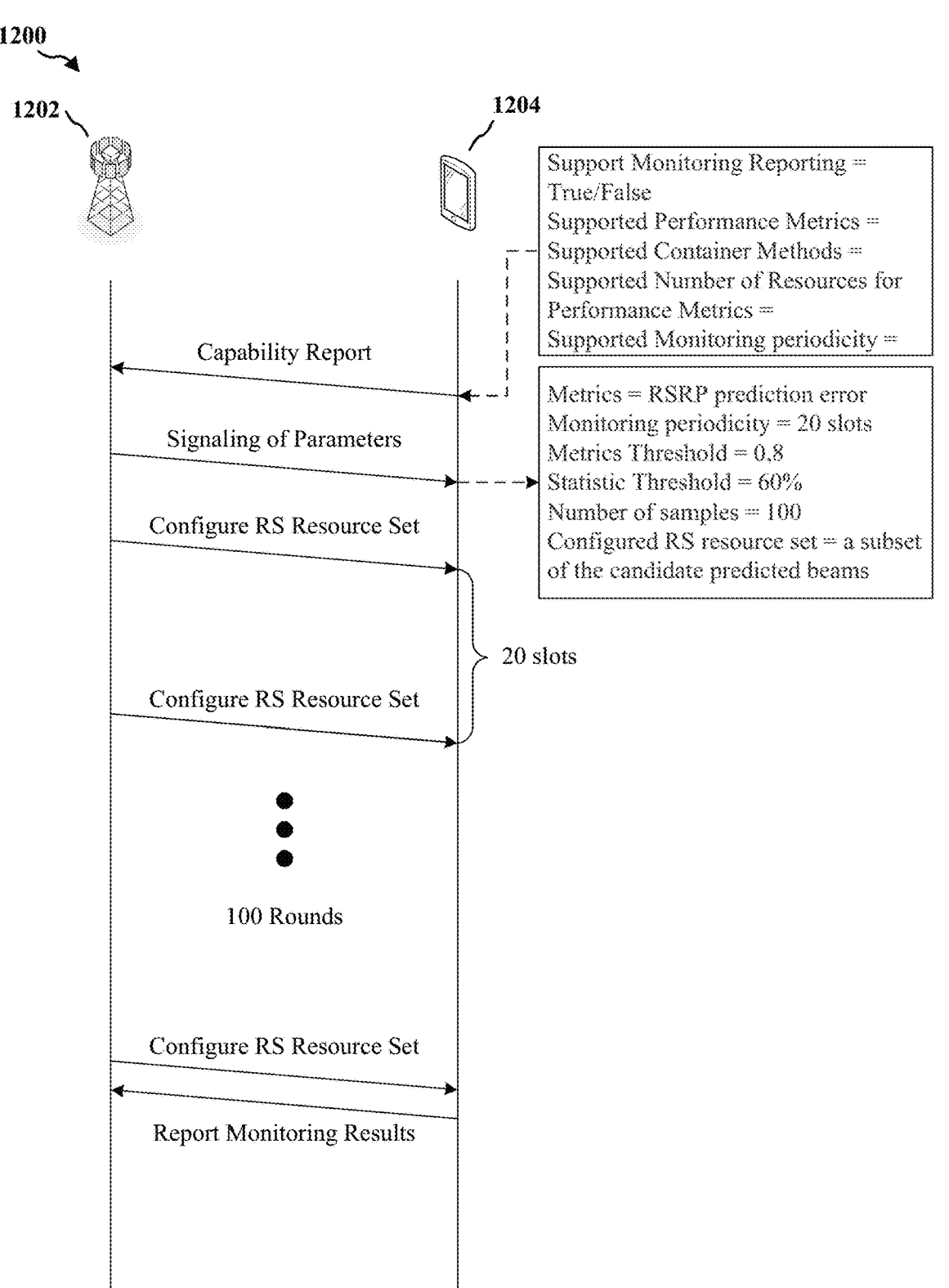
FIG. 12 is a diagram illustrating an embodiment of a UE reporting the statistics of the metrics.

FIG. 12 is a diagram 1200 illustrating an embodiment of a UE reporting the statistics of the metrics. Similar to the example of FIG. 10, the base station 1202 configures "enableAIreporting", "Monitoring_reporting", "Performance_metrics", "Container_method", "Number_of_resources", "Monitoring_freq" parameters for the UE 1204.

Further, in this example, the base station 1202 can configure the UE 1204 to report a monitoring event that determines whether the AI/ML model is performing well or poorly. This event is defined based on statistical analysis of multiple monitoring instances over a specified duration. In particular, the base station sets a "statistical threshold" parameter that indicates the percentage of monitoring instances that must meet the occurrence criteria in order to trigger the event. An "occurrence instance" means that in an individual monitoring instance, the value of the monitored performance metric (e.g. MSE) is less/greater than a "metrics threshold" value. For example, if the metrics threshold is 0.8 for the MSE, then an occurrence instance is when the monitored MSE is less than 0.8 in a single monitoring sample. The UE collects multiple monitoring instances at a regular "monitoring frequency" over a time "duration". If the percentage of instances meeting the occurrence criteria exceeds the statistical threshold, then the event is triggered. In this case, the UE determines if the model performs poorly based on whether enough instances over time meets the desired performance threshold, according to the statistical threshold percentage configured by the base station.

To configure this event reporting, the base station 1202 may signal additional parameters to the UE 1204. A "Statistic_threshold" parameter sets the percentage of monitoring instances that must meet the occurrence criteria in order to trigger the event that determines if the model is performing poorly. Specifically, the statistic threshold is the portion or ratio of "occurrence instances" within the total monitoring instances over a time duration. As explained before, an occurrence instance is when in a single monitoring sample, the performance metric violates the desired threshold, indicating degraded performance. If the Statistic_threshold is configured as 60%, that means 60% of the total monitoring instances/samples need to be occurrence instances for UE 1204 to declare and report that the model is performing poorly overall.

A "Metrics_threshold" parameter indicates the threshold of the monitored performance metric which is being used for determining an occurrence instance for the event. In this example, Metrics_threshold is set to 0.8, and each occurrence instance can be defined as when Performance_metrics (e.g., NMSE) are less than 0.8.

A "Number of samples" parameter indicates the total number of monitoring samples that the UE 1204 needs to measure and monitor before it can report on the statistical observation of the event. For instance, if Number_of_samples is set to 100, the UE 1204 is required to collect 100 monitoring instances to determine if the event condition, as defined by the Statistic_threshold, has been met.

In this example, following the configuration set by the base station 1202, the UE 1204 undertakes the monitoring process. It measures the configured subset of beams, executes the AI/ML model inference, calculates the NMSE of RSRP prediction error, and assesses whether each instance qualifies as an occurrence instance (e.g., by comparing the NMSE result against the Metrics_threshold of 0.8).

Each completion of this process constitutes one round of model monitoring. In this example, the UE 1204 initiates the next round of model monitoring after a period of 20 slots, as stipulated by the Monitoring_frequency/periodicity parameter, Monitoring_freq. In this example, the Number_of_samples is 100. Accordingly, once 100 measurement rounds are completed, the UE 1204 evaluates whether at least 60% (or another percentage as per the Statistic_threshold) of these instances have an NMSE of RSRP prediction error below 0.8.

If the condition is satisfied, the UE 1204 reports that the AI/ML model is performing adequately based on the predefined statistical threshold. Conversely, if the condition is not met, the UE 1204 reports that the model's performance is below expectations. This process ensures that the network can effectively monitor the AI/ML model's performance over time and make necessary adjustments to maintain optimal beam management.

Figure 13:
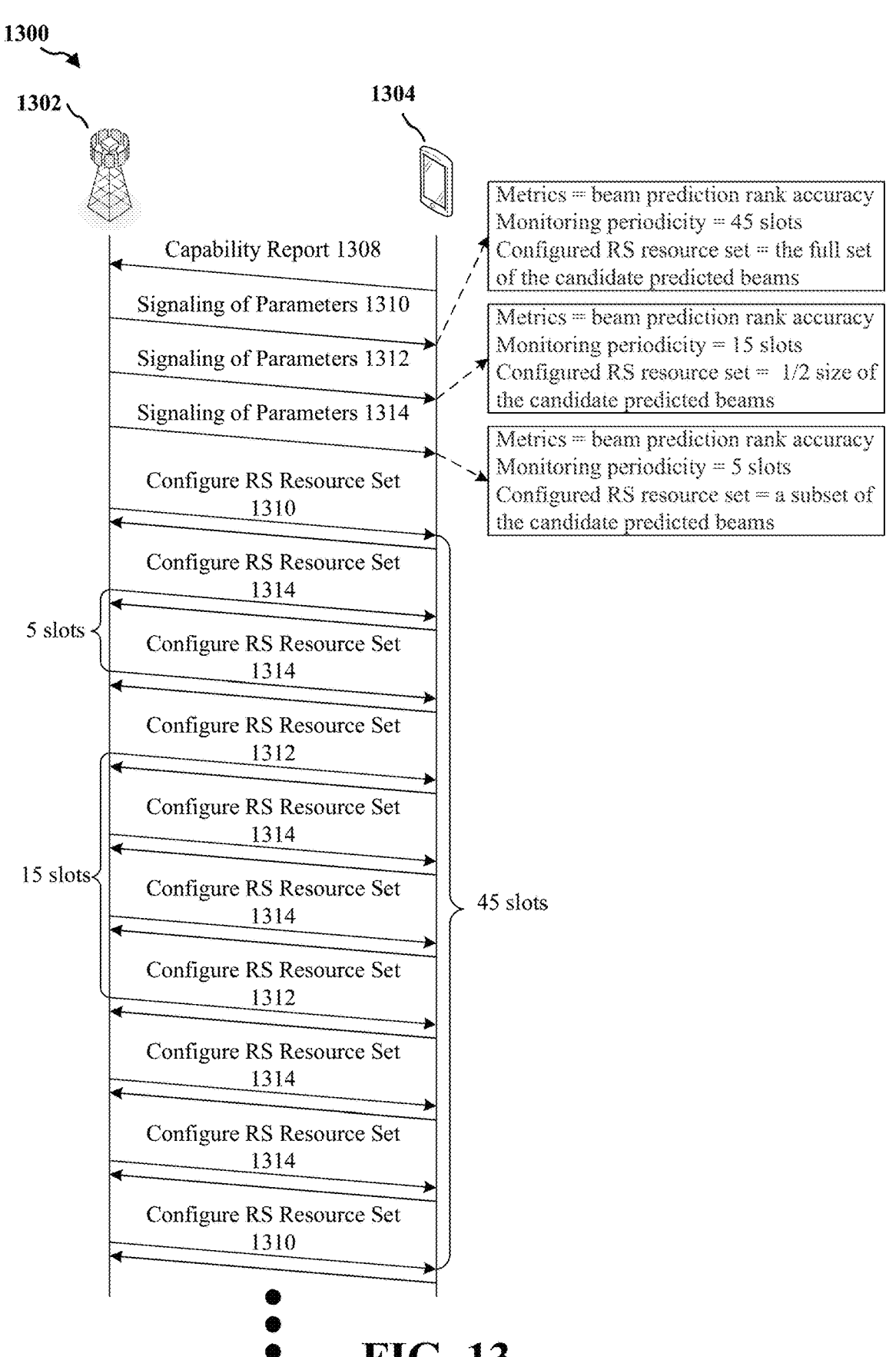
FIG. 13 is a diagram illustrating a UE configurated to monitor with difference resource set and different frequency.

FIG. 13 is a diagram 1300 illustrating an embodiment of a UE configured to monitor with different resource sets and frequencies. A UE 1304 transmits a capability report 1308 to a base station 1302. Based on the capability report from the UE 1304, the base station 1302 configures monitoring reporting in CSI-ReportConfig for the UE 1304 to monitor the AI/ML model by signaling the necessary parameters.

The base station 1302 may configure a monitoring reporting 1310 with the following configurations: Metrics=beam prediction rank accuracy, and monitoring periodicity=45 slots. This reporting will be linked to a resource set for UE measurement, which contains a full set of candidate beams for prediction.

The base station 1302 may configure a monitoring reporting 1312 with the following configurations: Metrics=beam prediction rank accuracy, and monitoring periodicity=15 slots. This reporting will be linked to a resource set for UE measurement, which contains a subset of candidate beams for prediction (½ size of the set of all the candidate beams for prediction).

The base station 1302 may configure a monitoring reporting 1314 with the following configurations: Metrics=beam prediction accuracy, and monitoring periodicity=5 slots. This reporting will be linked to a resource set for UE measurement, which contains a subset of candidate beams for prediction that is smaller than the subset used in monitoring reporting 1312.

The UE 1304 follows the configurations and measures each subset with the configured frequency and reports the calculated metrics.

The embodiment shown by FIG. 13 demonstrates the flexibility in AI/ML model monitoring, where the base station 1302 can dynamically adjust the reporting frequencies and resource sets based on the UE 1304 capabilities and network conditions. Such configurations enable the base station 1302 and the UE 1304 to collaboratively fine-tune the beam prediction process, optimizing the network's performance and enhancing the user's experience by ensuring the AI/ML model's predictions are accurate and up-to-date.

Figure 14:
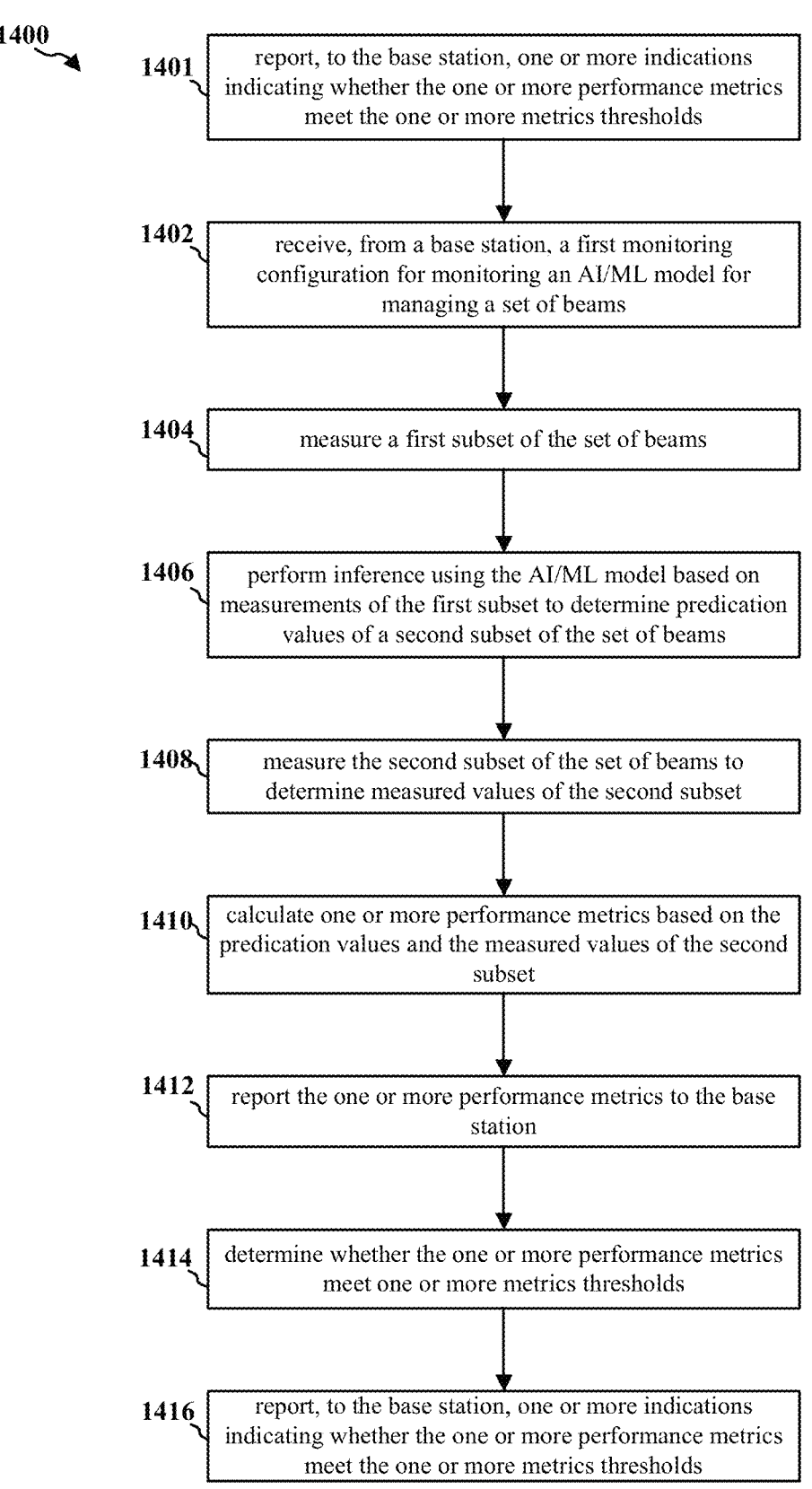
FIG. 14 is a flow chart of a method (process) for monitoring AI/ML model.

FIG. 14 is a flow chart 1400 of a method (process) for monitoring AI/ML model. The method may be performed by a UE (e.g., the UE 1004). In operation 1401, the UE transmits, to the base station, UE capabilities indicating support for monitoring the AI/ML model. The UE capabilities include at least one of an indication of support for monitoring reporting, a list of supported performance metrics, a list of supported reporting formats, a number of supported resources for the second subset, and a list of supported monitoring frequencies.

In operation 1402, the UE receives, from a base station, a first monitoring configuration for monitoring an artificial intelligence/machine learning (AI/ML) model for managing a set of beams. In certain configurations, the first monitoring configuration includes at least one of: the one or more performance metrics; a container method parameter specifying a reporting format to be used by the UE when reporting the one or more performance metrics or indications of whether the one or more performance metrics meet one or more metrics thresholds; a number of resources parameter specifying a number of resources to be measured for calculating the one or more performance metrics; a monitoring frequency parameter specifying a frequency at which the UE performs monitoring and collects samples; a metrics threshold parameter specifying values of the one or more metrics thresholds; a statistical threshold parameter specifying a percentage of monitoring instances that must meet an occurrence criteria over a number of samples to be collected in order to determine model performance; a number of samples parameter specifying the number of samples to be collected before applying a statistical threshold; a monitoring duration parameter specifying a duration over which the monitoring is performed; and an indication of a resource set that contains at least one of the first subset or the second subset.

In operation 1404, the UE measures a first subset of the set of beams. In operation 1406, the UE performs inference using the AI/ML model based on measurements of the first subset to determine predication values of a second subset of the set of beams, wherein the second subset is selected based on the first monitoring configuration. In operation 1408, the UE measures the second subset of the set of beams to determine measured values of the second subset. In operation 1410, the UE calculates one or more performance metrics based on the predication values and the measured values of the second subset, wherein the one or more performance metrics are selected based on the first monitoring configuration.

In certain configurations, the one or more performance metrics include at least one of a beam prediction accuracy metric, a beam prediction ranking accuracy metric, a reference signal received power (RSRP) prediction accuracy metric, a reference signal received quality (RSRQ) prediction accuracy metric, and a signal to interference plus noise ratio (SINR) prediction accuracy. In certain configurations, to calculate the one or more performance metrics, the UE compares each of the predication values with a corresponding measured value of the second subset, and determines the one or more performance metrics based on a result of the comparing.

In certain configurations, in operation 1412, the UE reports the one or more performance metrics to the base station. In certain configurations, in operation 1414, the UE determines whether the one or more performance metrics meet one or more metrics thresholds. In operation 1416, the UE reports, to the base station, one or more indications indicating whether the one or more performance metrics meet the one or more metrics thresholds.

In certain configurations, the UE receives at least one additional monitoring configuration. Each monitoring configuration is associated with a different monitoring frequency, a different resource set, and a different performance metric. The UE performs monitoring at the different monitoring frequencies by measuring the associated resource sets and calculates performance metrics based on the monitoring.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

receiving, from a base station, a first monitoring configuration for monitoring an artificial intelligence/machine learning (AI/ML) model for managing a set of beams;

measuring a first subset of the set of beams, wherein the first subset is selected based on the first monitoring configuration;

performing inference using the AI/ML model based on measurements of the first subset to determine prediction values of the set of beams;

filtering the prediction values of the set of beams to obtain filtered prediction values corresponding to a second subset of the set of beams, wherein the second subset is configured based on the first monitoring configuration and comprises fewer beams than the set of beams;

measuring the second subset of the set of beams to determine measured values of the second subset; and calculating one or more performance metrics based on the filtered prediction values and the measured values of the second subset, wherein the one or more performance metrics are selected based on the first monitoring configuration.

2. The method of claim 1, wherein the one or more performance metrics comprise at least one of:

a beam prediction accuracy metric, a beam prediction ranking accuracy metric, a reference signal received power (RSRP) prediction accuracy metric, a reference signal received quality (RSRQ) prediction accuracy metric, and a signal to interference plus noise ratio (SINR) prediction accuracy.

3. The method of claim 1, wherein calculating the one or more performance metrics comprises:

comparing each of the filtered prediction values with a corresponding measured value of the second subset; and determining the one or more performance metrics based on a result of the comparing.

4. The method of claim 1, further comprising:

reporting the one or more performance metrics to the base station.

5. The method of claim 1, further comprising:

determining whether the one or more performance metrics meet one or more metrics thresholds; and reporting, to the base station, one or more indications indicating whether the one or more performance metrics meet the one or more metrics thresholds.

6. The method of claim 1, wherein the first monitoring configuration comprise at least one of:

the one or more performance metrics;

a container method parameter specifying a reporting format to be used by the UE when reporting the one or more performance metrics or indications of whether the one or more performance metrics meet one or more metrics thresholds;

a number of resources parameter specifying a number of resources to be measured for calculating the one or more performance metrics;

a monitoring frequency parameter specifying a frequency at which the UE performs monitoring and collects samples;

a metrics threshold parameter specifying values of the one or more metrics thresholds;

a statistical threshold parameter specifying a percentage of monitoring instances that must meet an occurrence criteria over a number of samples to be collected in order to determine model performance;

a number of samples parameter specifying the number of samples to be collected before applying a statistical threshold;

a monitoring duration parameter specifying a duration over which the monitoring is performed; and an indication of a resource set that contains at least one of the first subset or the second subset.

7. The method of claim 1, further comprising:

transmitting, to the base station, UE capabilities indicating support for monitoring the AI/ML model.

8. The method of claim 7, wherein the UE capabilities comprise at least one of:

an indication of support for monitoring reporting, a list of supported performance metrics, a list of supported reporting formats, a number of supported resources for the first subset, a number of supported resources for the second subset, and a list of supported monitoring frequencies.

9. The method of claim 1, further comprising:

receiving at least one additional monitoring configuration, each monitoring configuration associated with a different monitoring frequency, a different resource set, and a different performance metric;

performing monitoring at the different monitoring frequencies by measuring the associated resource sets; and calculating performance metrics based on the monitoring.

10. An apparatus for wireless communication, the apparatus being a user equipment (UE), comprising:

a memory; and at least one processor coupled to the memory and configured to:

receive, from a base station, a first monitoring configuration for monitoring an artificial intelligence/machine learning (AI/ML) model for managing a set of beams;

measure a first subset of the set of beams, wherein the first subset is selected based on the first monitoring configuration;

perform inference using the AI/ML model based on measurements of the first subset to determine prediction values of the set of beams;

filter the prediction values of the set of beams to obtain filtered prediction values corresponding to a second subset of the set of beams, wherein the second subset is configured based on the first monitoring configuration and comprises fewer beams than the set of beams;

measure the second subset of the set of beams to determine measured values of the second subset; and calculate one or more performance metrics based on the filtered prediction values and the measured values of the second subset, wherein the one or more performance metrics are selected based on the first monitoring configuration.

11. The apparatus of claim 10, wherein the one or more performance metrics comprise at least one of: a beam prediction accuracy metric, a beam prediction ranking accuracy metric, a reference signal received power (RSRP) prediction accuracy metric, a reference signal received quality (RSRQ) prediction accuracy metric, and a signal to interference plus noise ratio (SINR) prediction accuracy.

12. The apparatus of claim 10, wherein to calculate the one or more performance metrics, the at least one processor is further configured to:

compare each of the filtered prediction values with a corresponding measured value of the second subset; and determine the one or more performance metrics based on a result of the comparing.

13. The apparatus of claim 10, wherein the at least one processor is further configured to:

report the one or more performance metrics to the base station.

14. The apparatus of claim 10, wherein the at least one processor is further configured to:

determine whether the one or more performance metrics meet one or more metrics thresholds; and report, to the base station, one or more indications indicating whether the one or more performance metrics meet the one or more metrics thresholds.

15. The apparatus of claim 10, wherein the first monitoring configuration comprise at least one of:

the one or more performance metrics;

a container method parameter specifying a reporting format to be used by the UE when reporting the one or more performance metrics or indications of whether the one or more performance metrics meet one or more metrics thresholds;

a number of resources parameter specifying a number of resources to be measured for calculating the one or more performance metrics;

a monitoring frequency parameter specifying a frequency at which the UE performs monitoring and collects samples;

a metrics threshold parameter specifying values of the one or more metrics thresholds;

a statistical threshold parameter specifying a percentage of monitoring instances that must meet an occurrence criteria over a number of samples to be collected in order to determine model performance;

a number of samples parameter specifying the number of samples to be collected before applying a statistical threshold;

a monitoring duration parameter specifying a duration over which the monitoring is performed; and an indication of a resource set that contains at least one of the first subset or the second subset.

16. The apparatus of claim 10, wherein the at least one processor is further configured to:

transmit, to the base station, UE capabilities indicating support for monitoring the AI/ML model.

17. The apparatus of claim 16, wherein the UE capabilities comprise at least one of:

an indication of support for monitoring reporting;

a list of supported performance metrics;

a list of supported reporting formats;

a number of supported resources for the first subset;

a number of supported resources for the second subset; and a list of supported monitoring frequencies.

18. The apparatus of claim 10, wherein the at least one processor is further configured to:

receive at least one additional monitoring configuration, each monitoring configuration associated with a different monitoring frequency, a different resource set, and a different performance metric;

perform monitoring at the different monitoring frequencies by measuring the associated resource sets; and calculate performance metrics based on the monitoring.

19. A non-transitory computer-readable medium storing computer executable code for wireless communication of a user equipment (UE), comprising code to:

receive, from a base station, a first monitoring configuration for monitoring an artificial intelligence/machine learning (AI/ML) model for managing a set of beams;

measure a first subset of the set of beams, wherein the first subset is selected based on the first monitoring configuration;

perform inference using the AI/ML model based on measurements of the first subset to determine prediction values of the set of beams;

filter the prediction values of the set of beams to obtain filtered prediction values corresponding to a second subset of the set of beams, wherein the second subset is configured based on the first monitoring configuration and comprises fewer beams than the set of beams;

measure the second subset of the set of beams to determine measured values of the second subset; and calculate one or more performance metrics based on the filtered prediction values and the measured values of the second subset, wherein the one or more performance metrics are selected based on the first monitoring configuration.

20. The non-transitory computer-readable medium of claim 19, wherein the one or more performance metrics comprise at least one of: a beam prediction accuracy metric, a beam prediction ranking accuracy metric, a reference signal received power (RSRP) prediction accuracy metric, a reference signal received quality (RSRQ) prediction accuracy metric, and a signal to interference plus noise ratio (SINR) prediction accuracy.

* * * * *